(12) United States Patent
Roberge

(10) Patent No.: US 10,920,671 B2
(45) Date of Patent: Feb. 16, 2021

(54) THRUST BALANCE CONTROL WITH DIFFERENTIAL POWER EXTRACTION

(71) Applicant: United Technologies Corporation, Farmington, CT (US)

(72) Inventor: Gary D. Roberge, Tolland, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 39 days.

(21) Appl. No.: 16/141,382

(22) Filed: Sep. 25, 2018

(65) Prior Publication Data

US 2020/0095941 A1    Mar. 26, 2020

(51) Int. Cl.
*F02C 7/32* (2006.01)
*F02C 3/06* (2006.01)
*F02C 7/36* (2006.01)
*H02P 9/00* (2006.01)

(52) U.S. Cl.
CPC ............... *F02C 7/32* (2013.01); *F02C 3/06* (2013.01); *F02C 7/36* (2013.01); *H02P 9/008* (2013.01); *F05D 2220/76* (2013.01); *F05D 2260/15* (2013.01)

(58) Field of Classification Search
CPC .... F05D 2220/76; F05D 2260/15; F02C 3/06; F02C 7/36; F02C 7/32; H02P 9/008
USPC ...................................................... 290/7, 52
See application file for complete search history.

(56) References Cited

U.S. PATENT DOCUMENTS

| | | | |
|---|---|---|---|
| 4,907,943 A * | 3/1990 | Kelch | F01D 3/04 415/1 |
| 5,455,472 A * | 10/1995 | Weiss | F16C 32/0442 310/90.5 |
| 7,168,913 B2 | 1/2007 | Lardellier | |
| 7,386,983 B2 | 7/2008 | Miller | |
| 7,950,237 B2 * | 5/2011 | Grabowski | F01D 21/04 60/226.1 |
| 8,814,502 B2 | 8/2014 | Eleftheriou | |

(Continued)

FOREIGN PATENT DOCUMENTS

| EP | 1574687 A1 | 9/2005 |
|---|---|---|
| EP | 2657457 A2 | 10/2013 |

(Continued)

OTHER PUBLICATIONS

European Search Report for European Application No. 19199648.7 dated Feb. 7, 2020.

*Primary Examiner* — Charles Reid, Jr.

(74) *Attorney, Agent, or Firm* — Carlson, Gaskey & Olds, P.C.

(57) ABSTRACT

A gas turbine engine includes a first spool including a first compressor coupled to a first turbine through a first shaft, a second spool including a second compressor coupled to a second turbine through a second shaft. A first tower shaft is coupled to the first shaft through a first gear assembly and a second tower shaft is coupled to the second shaft through a second gear assembly. A first load generating device is driven by the first tower shaft and a second load generating device is driven by the second tower shaft. A controller controls each of the first load generating device and the second load generating device to vary a proportion of the total load applied to each of the first spool and the second spool to bias a direction of an axial load on each of the first spool and the second spool.

18 Claims, 9 Drawing Sheets

(56) References Cited

U.S. PATENT DOCUMENTS

| | | |
|---|---|---|
| 8,966,911 B2 | 3/2015 | Ress, Jr. et al. |
| 9,121,351 B2 | 9/2015 | Ress, Jr. et al. |
| 2008/0016880 A1 | 1/2008 | Bruno et al. |
| 2009/0205341 A1 | 8/2009 | Muldoon |
| 2013/0247539 A1 | 9/2013 | Hoppe |
| 2016/0010490 A1* | 1/2016 | Schwarz .................. F01D 3/04 415/1 |
| 2017/0226859 A1 | 8/2017 | Edwards et al. |
| 2018/0202368 A1 | 7/2018 | Suciu et al. |

FOREIGN PATENT DOCUMENTS

| | | |
|---|---|---|
| GB | 2197392 | 5/1988 |
| WO | 2014143219 A1 | 9/2014 |

\* cited by examiner

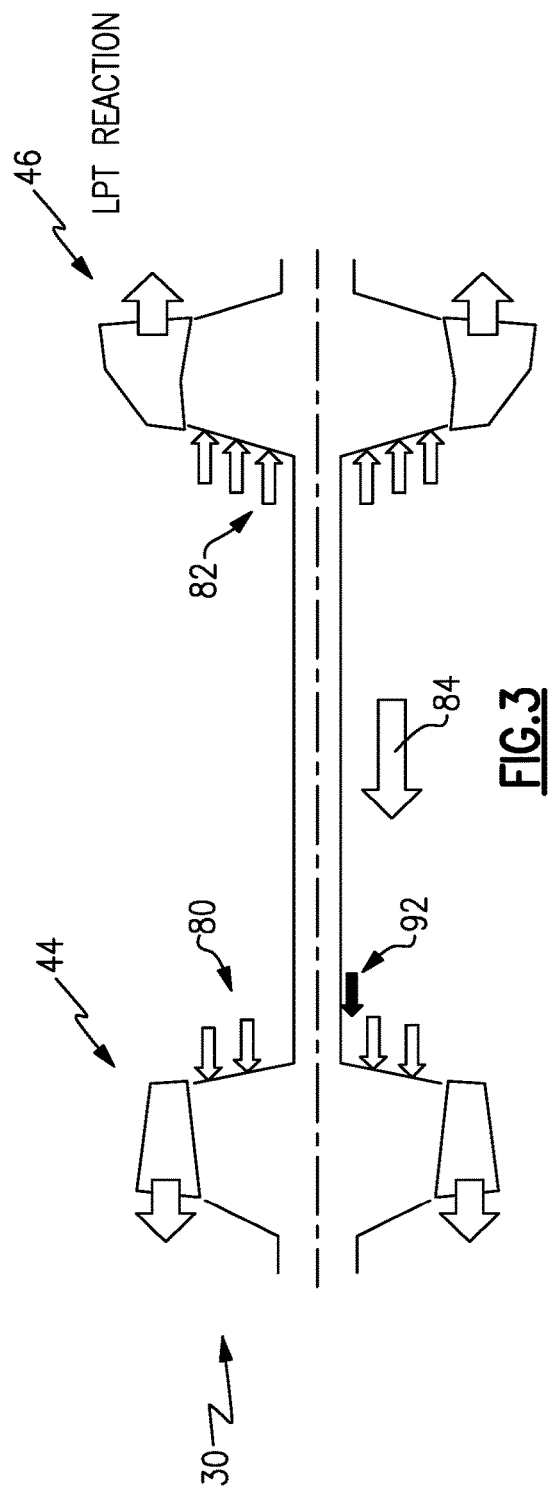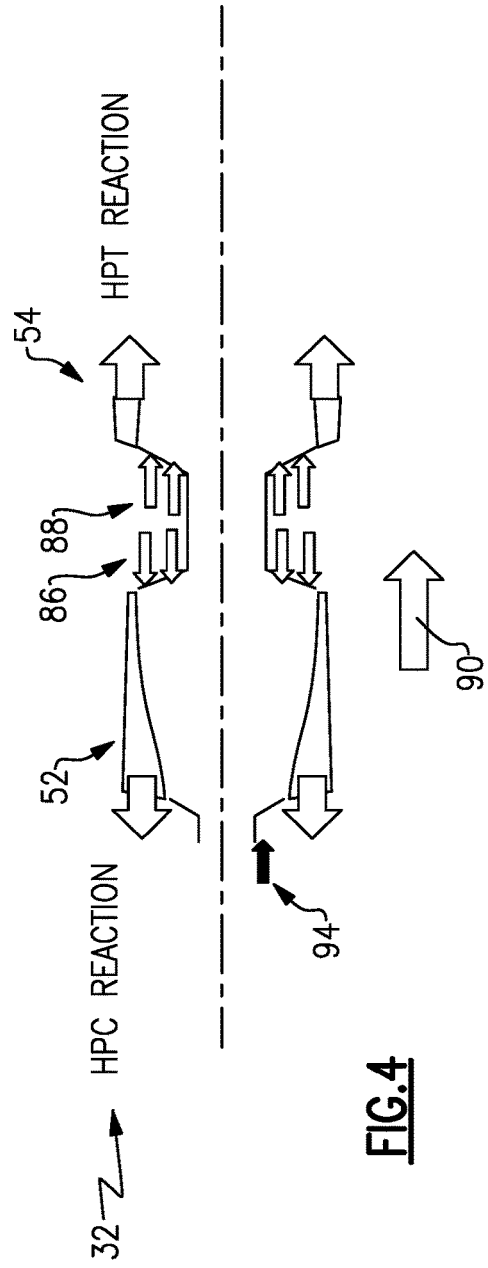

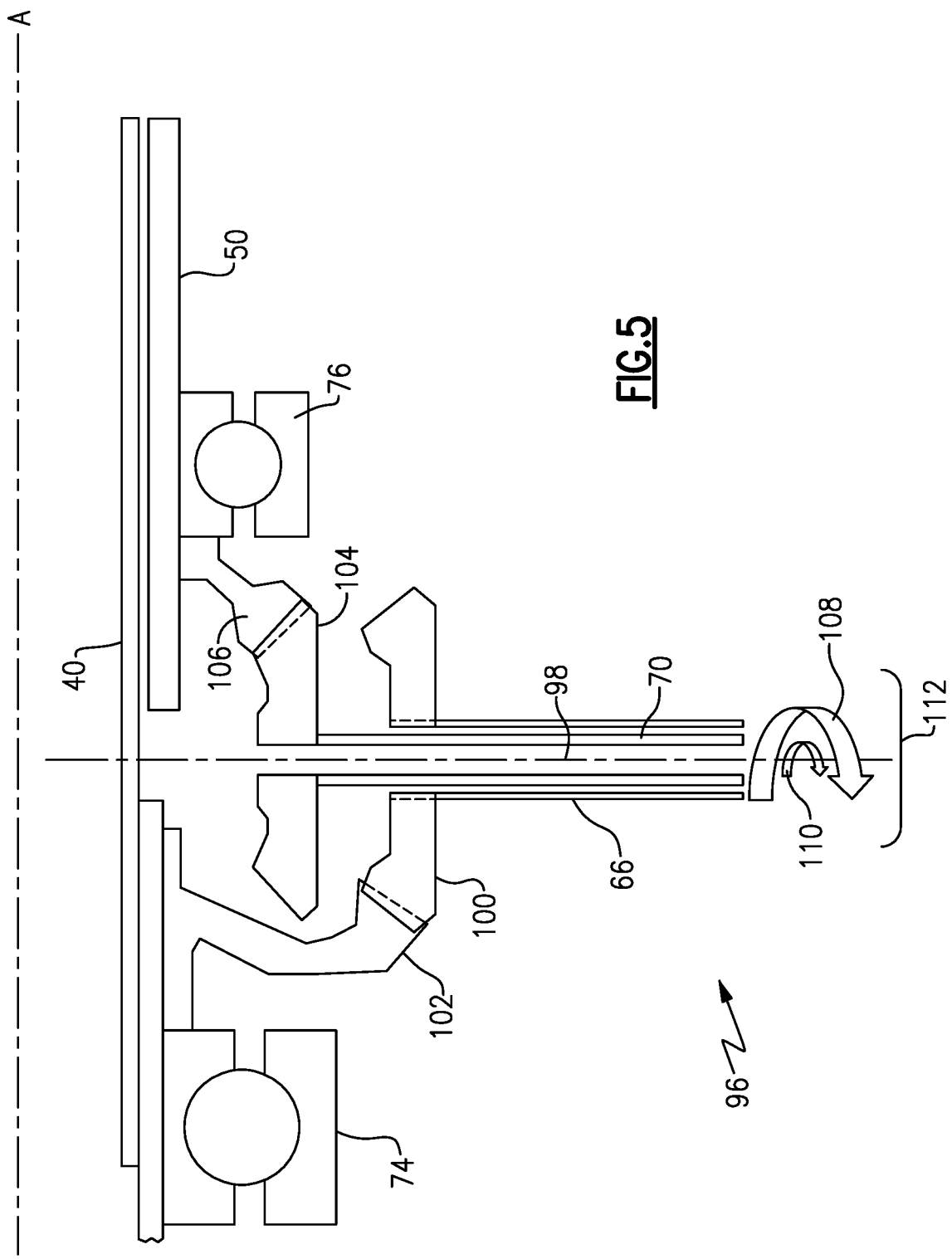

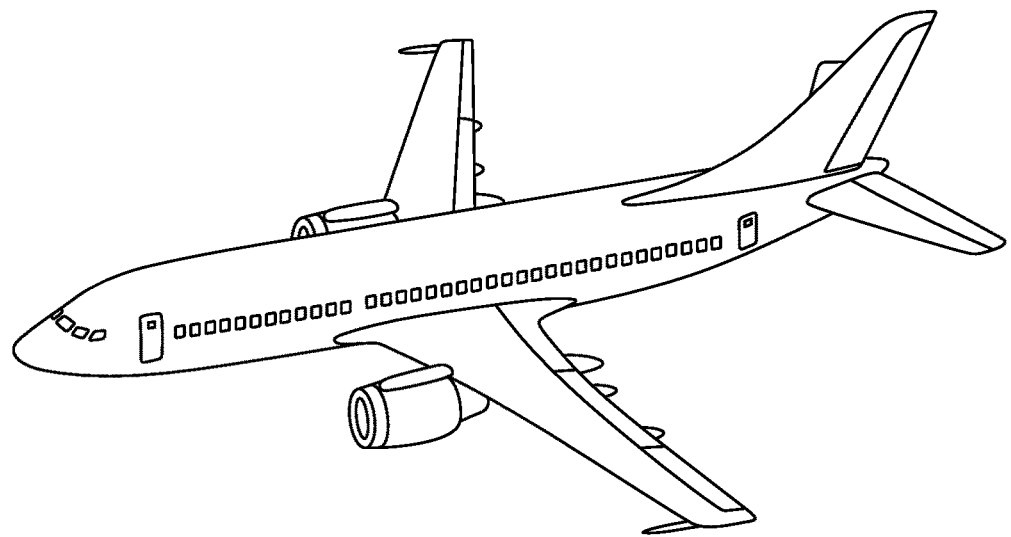
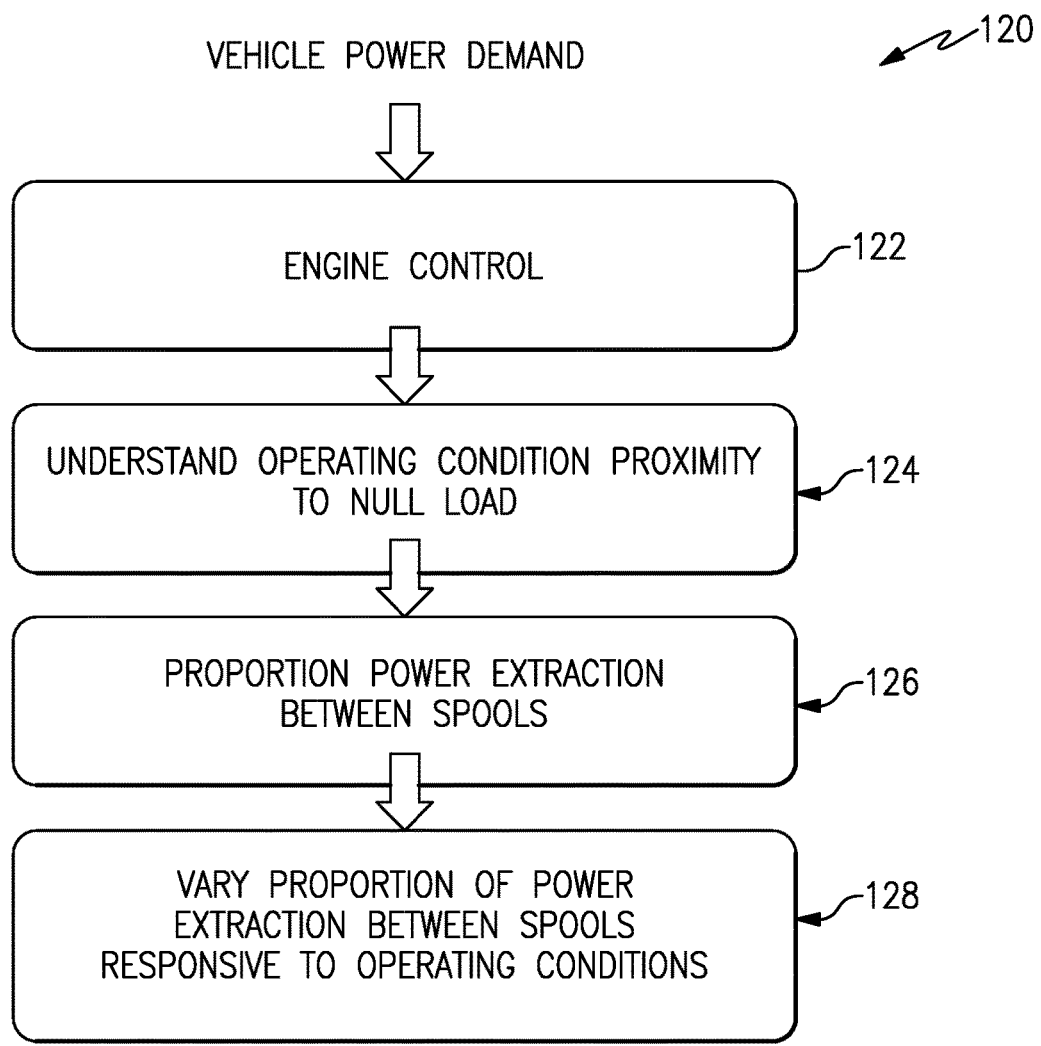
FIG.9

THRUST BALANCE CONTROL WITH DIFFERENTIAL POWER EXTRACTION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The high spool and the low spool are supported on bearing structures fixed to a static structure of the engine. Axial loads are accommodated by thrust bearing assemblies supporting each of the high spool and low spool. The compressor and turbine on each of the respective high and low spool generate opposing axial loads. In some instances, the loads counterbalance each other such that no substantial axial load is applied to the bearing structures. Such low or null axial load conditions can alter engine operation and a reduce engine efficiency.

Turbine engine manufacturers continue to seek further improvements to engine performance including improvements to thermal, transfer and propulsive efficiencies.

SUMMARY

A gas turbine engine according to an exemplary embodiment of this disclosure includes, among other possible things, a first spool including a first compressor coupled to a first turbine through a first shaft; a second spool including a second compressor coupled to a second turbine through a second shaft; a first tower shaft coupled to the first shaft through a first gear assembly; a second tower shaft couple to the second shaft through a second gear assembly; and a first load generating device driven by the first tower shaft, wherein the first load generating device generates a first load on the first spool through the first tower shaft; a second load generating device driven by the second tower shaft, wherein the second load generating device generates a second load on the second spool through the second tower shaft and the first load and the second load combine to apply a total load on the first spool and the second spool; and a controller controlling each of the first load generating device and the second load generating device to vary a proportion of the total load applied to each of the first spool and the second spool to bias a direction of an axial load on each of the first spool and the second spool.

In a further embodiment of the foregoing gas turbine engine, the axial load on each of the first spool and the second spool is biased away from a null load condition.

In another embodiment of any of the foregoing gas turbine engines, the first spool is supported for rotation by a first thrust bearing and the second spool is supported for rotation by a second thrust bearing. The controller varies each of the first load and the second load to maintain an axial load of a predefined amount on each of the first thrust bearing and the second thrust bearing.

In another embodiment of any of the foregoing gas turbine engines, the first load generating device comprises a first electric generator and the second load generating device comprises a second electric generator.

In another embodiment of any of the foregoing gas turbine engines, an accessory gearbox is mounted to a static structure of the gas turbine engine and each of the first generator and the second generator are mounted to the accessory gearbox.

In another embodiment of any of the foregoing gas turbine engines, the first tower shaft and the second tower shaft are disposed about a common tower shaft axis of rotation.

In another embodiment of any of the foregoing gas turbine engines, the first tower shaft and the second tower shaft are concentric about the common tower shaft axis of rotation.

In another embodiment of any of the foregoing gas turbine engines, the first generator is mounted to a first accessory gearbox, the second generator is mounted to a second accessory gearbox, and the first tower shaft extends radially outward and is spaced circumferentially apart from the second tower shaft.

In another embodiment of any of the foregoing gas turbine engines, the first generator and the second generator combine to generate a total amount of power with a proportion of the total amount of power varying between the first generator and the second generator.

Another gas turbine engine according to an exemplary embodiment of this disclosure includes, among other possible things, a first spool including a first compressor coupled to a first turbine through a first shaft; a second spool including a second compressor coupled to a second turbine through a second shaft; a first tower shaft coupled to the first shaft through a first gear assembly; a second tower shaft couple to the second shaft through a second gear assembly; and a first load generating means driven by the first tower shaft, wherein the first load generating means generates a first load on the first spool through the first tower shaft; a second load generating means driven by the second tower shaft, wherein the second load generating means generates a second load on the second spool through the second tower shaft and the first load and the second load combine to apply a total load on the first spool and the second spool; and a controller controlling each of the first load generating means and the second load generating means to vary a proportion of the total load applied to each of the first spool and the second spool to bias a direction of an axial load on each of the first spool and the second spool.

In a further embodiment of the foregoing gas turbine engine, the axial load on each of the first spool and the second spool is biased in a direction away from a null load condition.

In another embodiment of any of the foregoing gas turbine engines, the first spool is supported for rotation by a first thrust bearing and the second spool is supported for rotation by a second thrust bearing. The controller varies each of the first load and the second load to maintain an axial load of a predefined amount on each of the first thrust bearing and the second thrust bearing.

In another embodiment of any of the foregoing gas turbine engines, the first load generating means and the second generating means combine to generate a total load corresponding to a total power demand A proportion of the total load provided by each of the first load generating means and the second load generating means is varied to provide a predefined axial load on the first spool and the second spool to maintain an axial bias along a longitudinal axis of the gas turbine engine.

A method of operating a gas turbine engine according to an exemplary embodiment of this disclosure includes, among other possible things, generating a first axial load on a first spool with a first load generating device; generating a second axial load on a second spool with a second load generating device, wherein the first load and the second load combine to apply a total load on the first spool and the second spool; and varying a proportion of the first axial load and the second axial load combined to provide the total load to generate a predefined amount of axial load for each of the first spool and the second spool to prevent a null load condition on each of the first spool and the second spool.

In a further embodiment of the foregoing method of operating a gas turbine engine, the first spool includes a first compressor coupled to a first turbine through a first shaft, and the second spool includes a second compressor coupled to a second turbine through a second shaft. Each of the first spool and second spool define a varying balance of loads between the corresponding first and second compressors and the first and second turbines. A first load generating device coupled to the first spool and a second load generating device coupled to the second spool provide the corresponding first and second axial loads to maintain an axial bias on each of first and second spools.

In another embodiment of any of the foregoing methods of operating a gas turbine engine, the first load generating device is a first electric generator and the second load generating device is a second electric generator. A load applied by each of the first electric generator and the second electric generator are varied to apply the axial load to each of the first spool and the second spool.

In another embodiment of any of the foregoing methods of operating a gas turbine engine, the first electric generator and the second electric generator combine to produce a total amount of electric power. A controller varies a proportion of the total amount of electric power provided by each of the first and second electric generators to provide the desired axial load while maintaining the total amount of electric power constant.

In another embodiment of any of the foregoing methods of operating a gas turbine engine, a first gear coupling between a first tower shaft and the first load generating device and the first spool and a second gear coupling between a second tower shaft and the second load generating device and the second spool is included. A gear reaction load for each of the first gear coupling and the second gear coupling is defined to provide a desired axial load on the corresponding one of the first spool and the second spool.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a force diagram of forces on a first spool of the example gas turbine engine.

FIG. 4 is a force diagram of forces on a second spool of the example gas turbine engine.

FIG. 5 is a cross-section of a portion of an example tower shaft assembly.

FIG. 9 is a diagram illustrating a method of thrust balance control according to an example embodiment.

DETAILED DESCRIPTION

Figure 1:
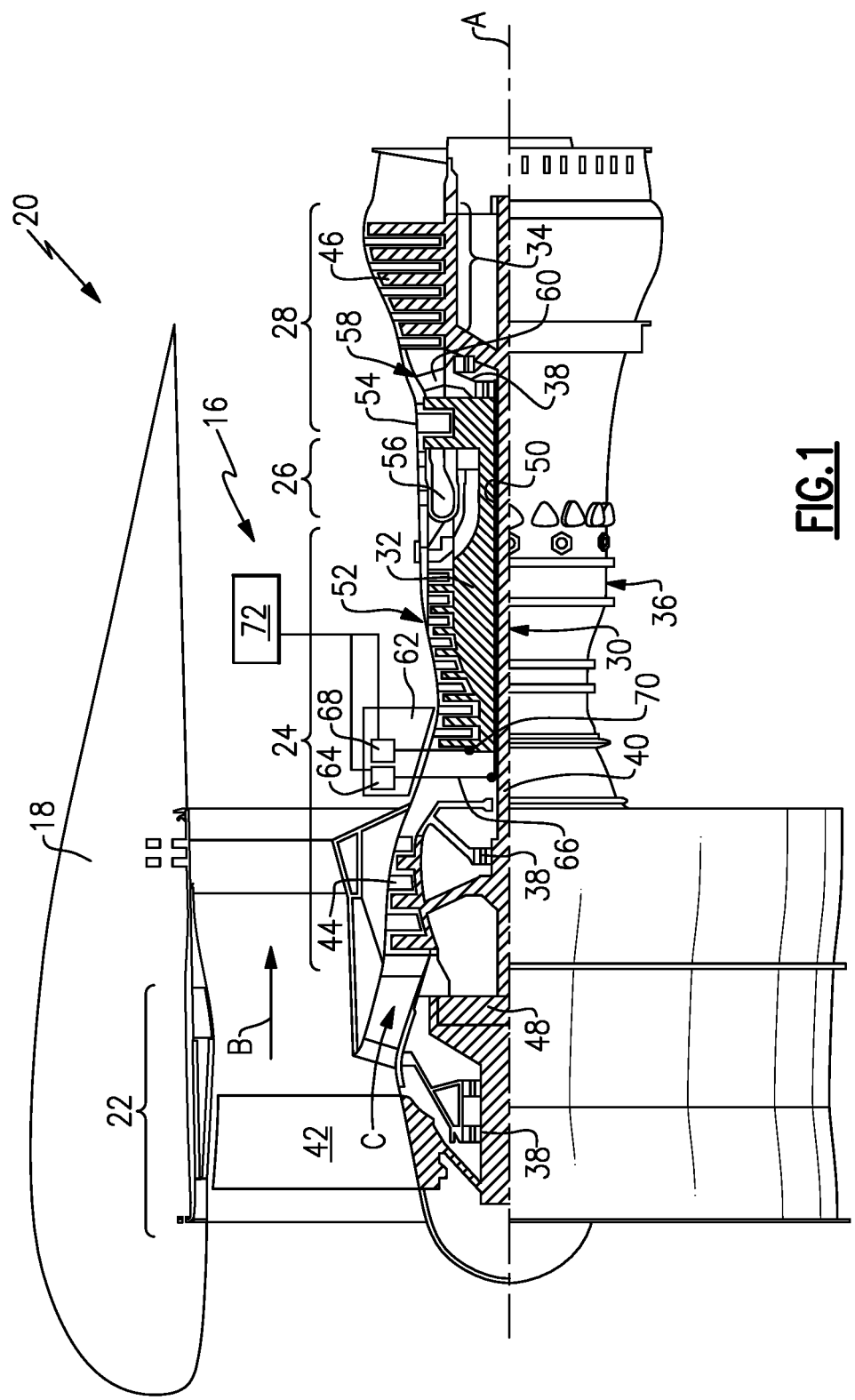
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan 22 through a speed change mechanism, which in exemplary gas turbine engine 20 is illustrated as a geared architecture 48 to drive the fan 22 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of the low pressure compressor, or aft of the combustor section 26 or even aft of turbine section 28, and fan 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan 22 that comprises in one non-limiting embodiment less than about 26 fan blades 42. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of fan blades 42 in the fan section 22 disclose an example gas turbine engine 20 with increased power transfer efficiency.

The engine 20 includes an accessory drive system 16 that includes an accessory gearbox 62 that supports a first generator 64 driven by a first tower shaft 66 and a second generator 68 driven by a second tower shaft 70. The first tower shaft 66 is driven by the low speed spool 30 and the second tower shaft 70 is driven by the high speed spool 32. The first and second generators 64, 68 provide power electric power to the aircraft and other systems of the engine 20. A controller 72 controls both the first and second generators 64, 68 to proportion the amount of power drawn from each to provide the desired amount of electric power. The proportion of power provided by each of the first and second generators 64, 68 is varied by the controller 72 to adapt to operational changes in the engine 20.

Figure 2:
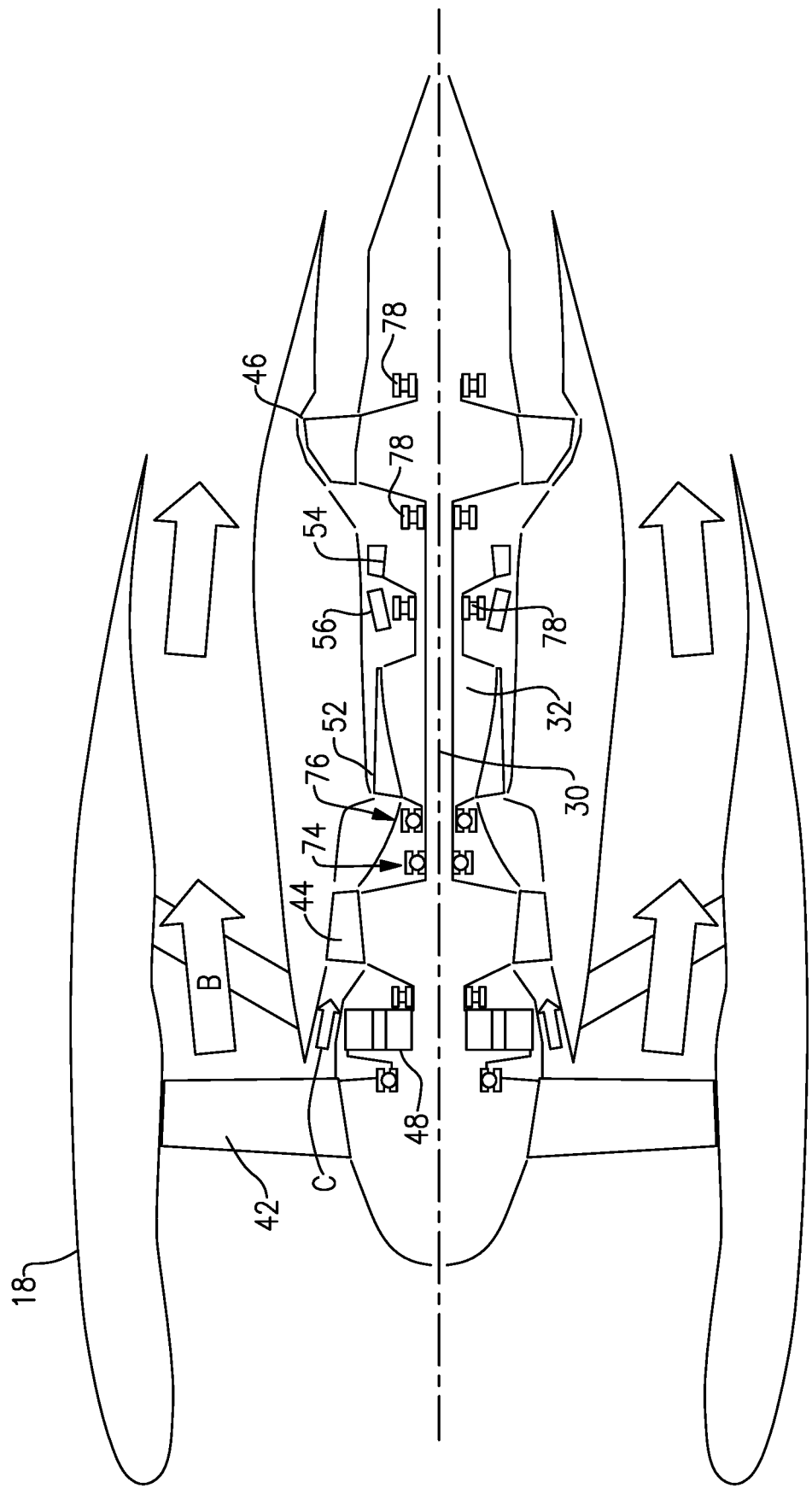
FIG. 2 is another schematic view of the example gas turbine engine.

Referring to FIG. 2 with continued reference to FIG. 1, the high speed spool 32 is supported at a forward end by a thrust bearing 76. The low speed spool 30 is supported at the forward end by a thrust bearing 74. Both the high speed spool 32 and the low speed spool 30 are supported at aft end by a roller bearing 78. A fan thrust load is reacted and accommodated separate from the low speed spool 30 because of the intervening geared architecture 48. The thrust bearings 74, 76 support rotation and also maintain an axial position of the forward end of each of the low and high spools 30, 32. An axial load is incurred on each of the thrust bearings 74, 76 such that corresponding bearing surfaces remain in contact. The axial load is transferred through the thrust bearings 74, 76 to the engine static structure. The axial load born by the bearings 74, 76 is a summation of forces on each spool 30, 32. The forces are generated by pressures within the compressor sections and turbine sections that are very large and often in opposing directions. The resultant force on each of the spools 30, 32 varies through engine operation due to changes in thrust generation, rotor speed, pressures, temperature as well as numerous other operational parameters.

Thrust bearings 74 and 76 are designed with shoulder surfaces and geometry that enable a defined amount of axial movement to accommodate load transitions from one loading state to another (i.e. forward to aft thrust loading) that occur during the extremes of engine operating condition. The changes in operation can in some instances result in "null" operating condition where opposing forces cancel each other such that the axial load on the bearings 74, 76 approaches zero. In such "null" conditions, the spools 30, 32 can cause increased vibrations and/or shift axially rather than bear against the designed bearing shoulder surfaces of each thrust bearing 74, 76. The axial movement can also result in blade deflections and contact between the blade tip and abradable blade outer air seals. The "null" condition is currently accommodated by changing the engine operating condition by increasing or decreasing throttle settings commonly referred to as throttle bump.

Moreover, increased power demands make extraction of power from both the spools 30, 32 more advantageous to prevent excessive loads on one spool that can alter engine operating efficiencies and engine operability. The example disclosed engine 20 includes the accessory drive system 16 that extracts power proportionally from each spool 30, 32 in a varying manner to avoid "null" load conditions.

Referring to FIGS. 3 and 4 with continued reference to FIG. 2, force diagrams of forces acting on each of the spools 30, 32 are schematically shown. Forces on the low speed spool (not including the geared architecture and fan rotor thrust loading) includes forces 80 in the compressor section 44 that act in a forward direction and forces 82 in the turbine section 46 acting in opposite direction. Fan rotor thrust do not contribute to loading on the low speed spool 30 due to the intervening geared architecture 48. However, for direct drive engines where the fan section is 22 is tied to the low speed spool 30, such forces would be included in the force balance. Accordingly, although the example disclosed embodiment includes a geared architecture 48 for driving the fan section 22, engines that directly drive the fan section 22 would benefit from and are within the contemplation of this disclosure.

The opposing forces 80, 82 combine during normal operating conditions to generate an axial load such that an axial load is placed on the corresponding thrust bearing 74. Similarly, forces 86 acting in the high pressure compressor 52 counter forces 88 in the high pressure turbine 54 to generate a net axial load against the thrust bearing 76. Forces 80, 82, 86 and 88 include pressure and aerodynamic reaction loads primarily consisting of loading on compressor and turbine airfoils as well as piston and diaphragm forces created by the reaction of internal engine cooling and pressurization airflows on compressor and turbine rotor structures.

In some operating conditions, the forces 80, 86 on the corresponding compressor sections 44, 52 balance against the opposing forces 82, 88 in the corresponding turbines 46, 54. This balance of forces generates a substantially zero axial load in a "null" load condition.

An additional load is placed on each spool 30, 32 by the accessory drive system 16 (FIG. 1) as power (torque at a given rotational speed) is transferred through gearing that mechanically connects the accessory drive system and rotors. The additional load on the low speed spool 30 created by gear meshing is schematically indicated at 92. The additional load on the high speed spool 32 created by the gear meshing is schematically shown at 94. Variation of the loads 92, 94 is controlled by the disclosed system to assure that a net axial load is always present in each of the spools 30, 32. Accordingly, in this example the load 92 is applied to assure a net axial load schematically indicated at 84. The load 94 is varied and applied to maintain a net axial load schematically indicated at 90.

Figure 6:
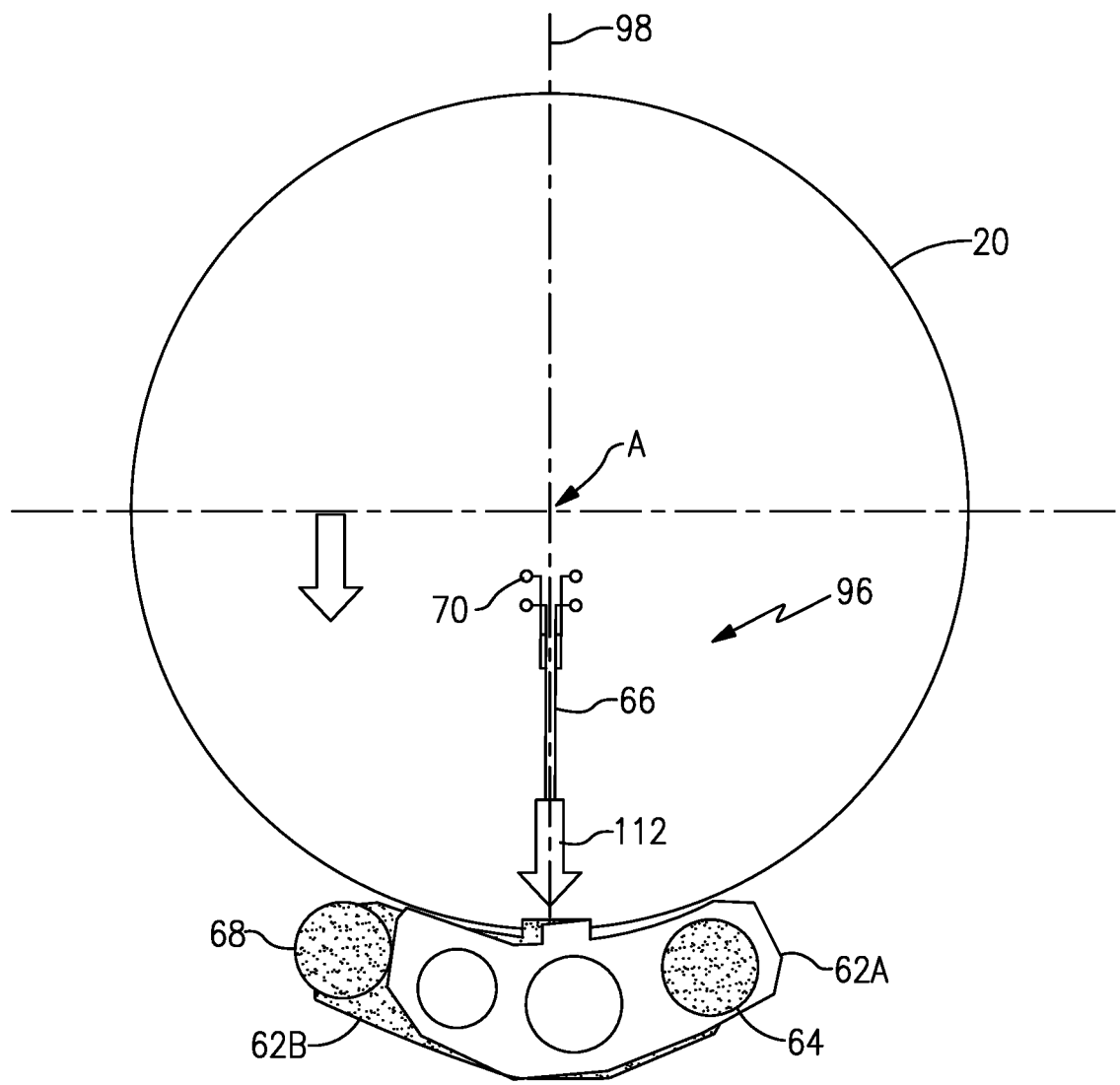
FIG. 6 is a schematic view of an example accessory drive system embodiment.

Referring to FIGS. 5 and 6 with continued reference to FIGS. 2, 3 and 4 a tower shaft assembly 96 is schematically shown and is includes a first tower shaft 66 and a second tower shaft 70. The first tower shaft 66 is coupled through a first gear assembly including gears 100 and 102 to the low speed spool 30 creating the load 92. The second tower shaft 70 is coupled through a second gear assembly including gears 104 and 106 to the high speed spool 32 creating axial reaction load 94. The coupling of gear 100 to gear 102 generates an axial load on the low speed spool 30 with magnitude and direction (axially forward or aft) of the gear reaction load dependent on a number of factors including transmitted toque, operating speed (RPM) and gear tooth geometry. The first tower shaft 66 drives a first accessory gear box 62A that includes the first generator 64. The second tower shaft 70 drives a second accessory gear box 62B that includes the second generator 68.

The axial load that is exerted on the low speed spool 30 is partially dependent on the load caused by rotary power transfer through the first tower shaft 66. The load caused by the first tower shaft 66 is in turn a sum of the accessory components driven through the accessory gear box 62A, including the first generator 64. Similarly, the load on the high speed spool 32 from the second tower shaft 70 is a result of loads caused by driving components of the second accessory gear box 62B and the second generator 68. Accordingly, the axial load placed on each of the spools 30, 32 is partially generated by loads through each of the tower shafts 66, 70. Variation of loads on each of the tower shafts 66, 70 are therefore controlled to adjust axial loads on each of the spools 30, 32 to prevent "null" load conditions.

In the disclosed example shown in FIG. 5, the tower shafts 66, 70 are concentric and disposed about a common rotational axis 98. The specific structure of the coupling between gears 100 and 102 and between gears 104 and 106 is determined and defined to enable control of axial loads exerted on the corresponding spools 30, 32.

The load on the first tower shaft 66 is schematically shown at 108 and the load on the second tower shaft 70 is shown at 110. The loads 108 and 110 combine to define a total load 112. The total load 112 is indicative of the power extracted from both the spools 30, 32 needed to supply power to for operation of the engine accessory systems including the first and second generators 64, 68. Varying the proportion of each load 108, 110 to obtain the total load 112 enables application of an axial load on each of the spools 30, 32 to avoid "null" load conditions.

Figure 7:
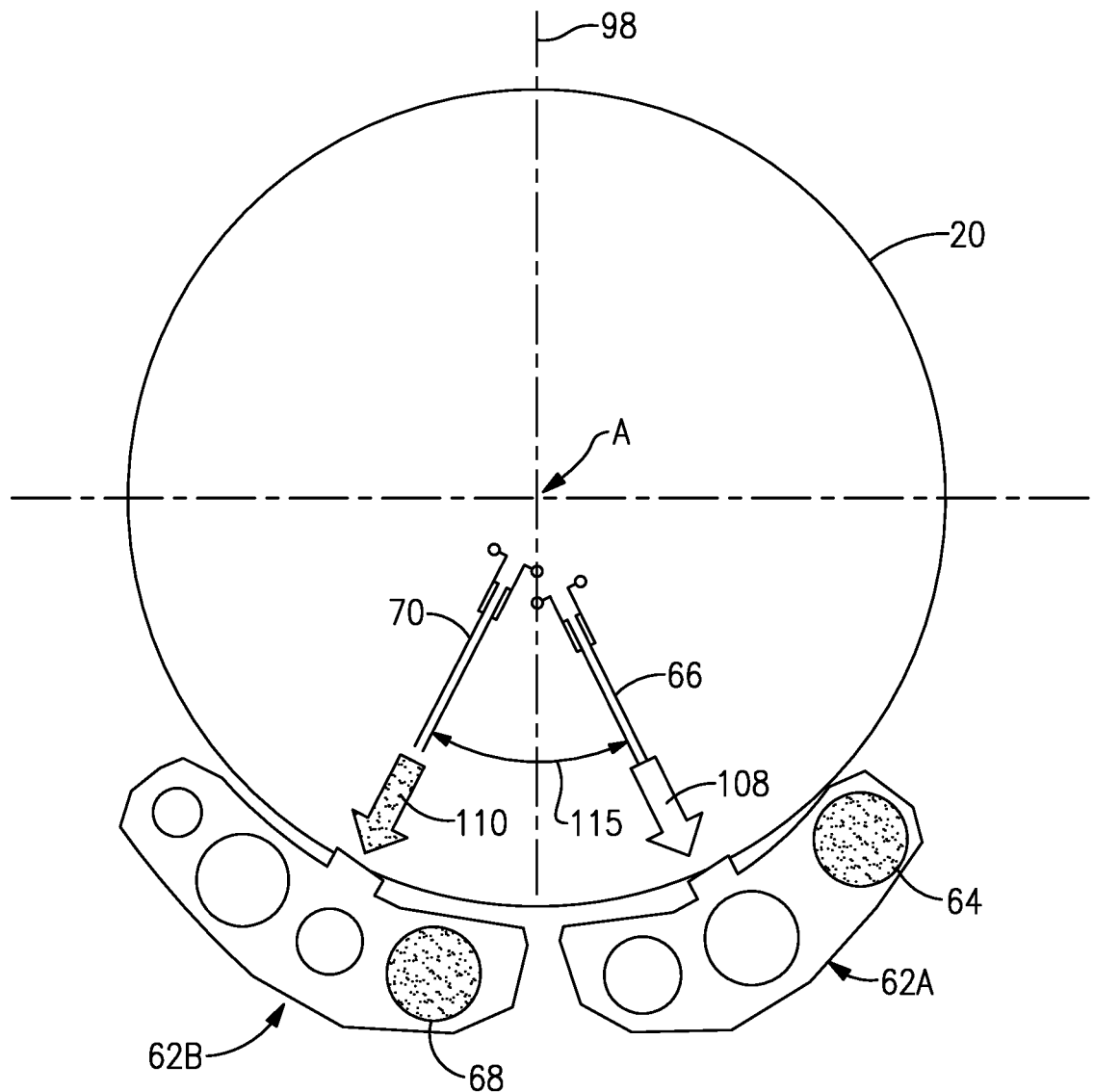
FIG. 7 is a schematic view of another example accessory drive system embodiment.

Referring to FIG. 7, another example accessory drive system embodiment is disclosed. The accessory drive system shown in FIG. 7 includes the first tower shaft 66 that extends radially from the engine longitudinal axis A and is spaced circumferentially apart a distance 115 from the second tower shaft 70. The first accessory gear box 62A is therefore spaced apart from the second accessory gear box 62B a corresponding circumferential distance.

Figure 8:
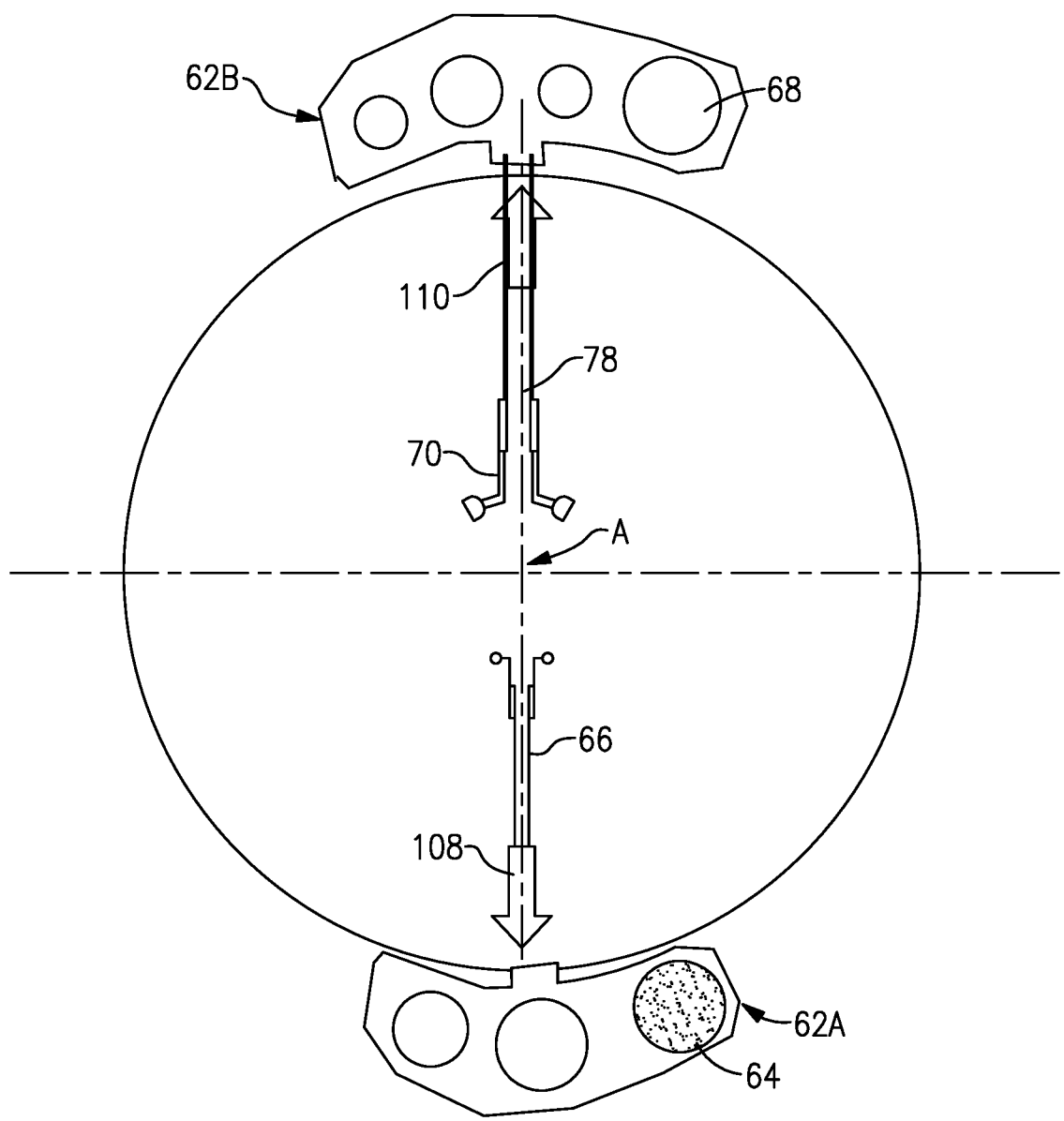
FIG. 8 is a schematic view of yet another example accessory drive system embodiment.

Referring to FIG. 8, another example accessory drive system embodiment is disclosed. The accessory drive system shown in FIG. 8 includes the first tower shaft 66 spaced 180 degrees apart from the second tower shaft 70. The first and second tower shafts 66, 70 may therefore be disposed along the common rotational axis 98, but are not concentric.

The accessory drive system embodiments shown in FIGS. 6, 7 and 8 are examples of configurations within the scope and contemplation of this disclosure. Other embodiments may include multiple accessory drive systems including multiple tower shafts 66 and 70 connecting to spools 30 and 32. The common element of each of the disclosed accessory drive systems is power extraction from each of the spools 30, 32 in a manner that may be proportioned to vary an axial load.

Figure 10:
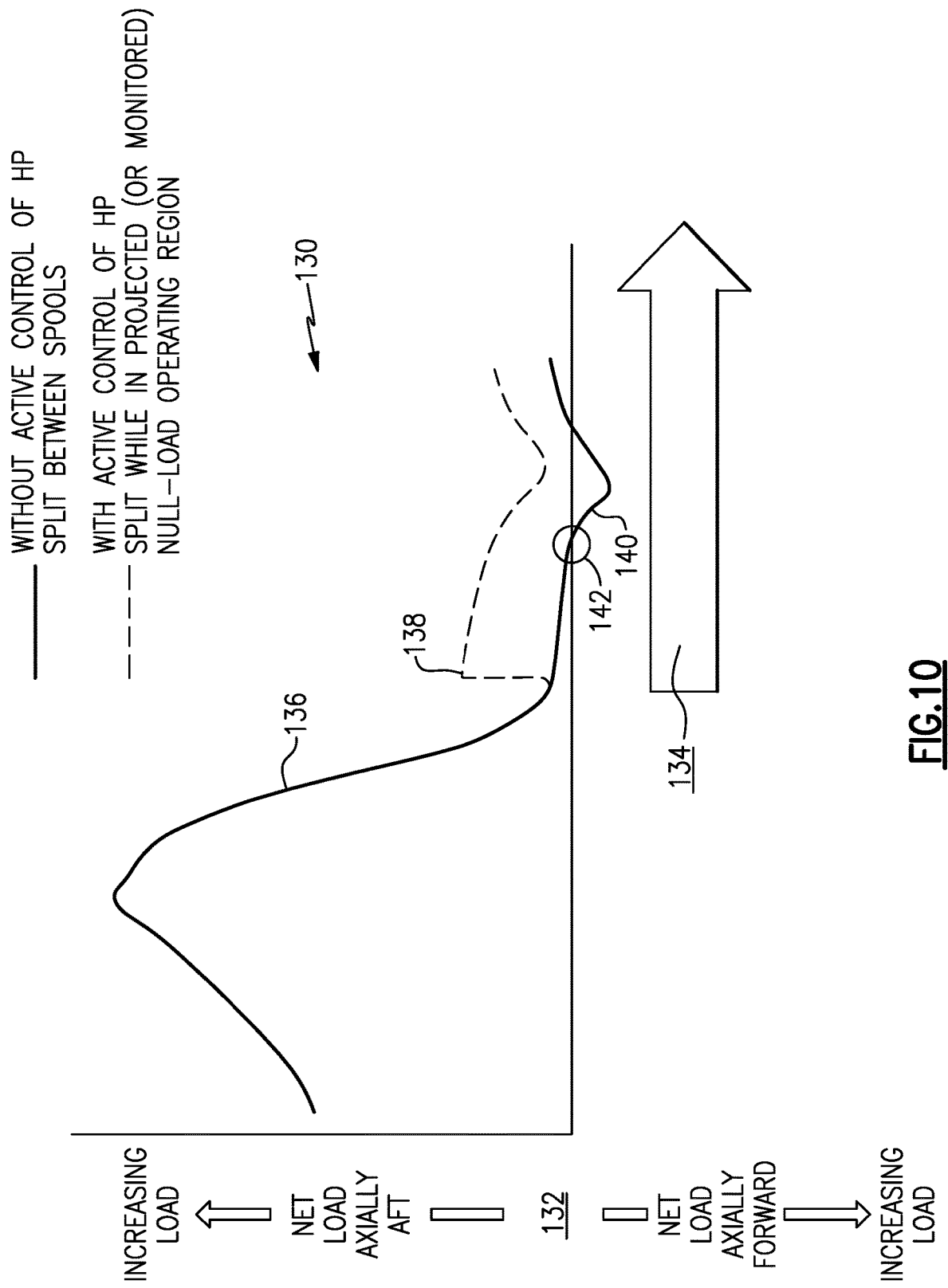
FIG. 10 is a graph illustrating variations in axially loads with the example thrust balance control.

Referring to FIGS. 9 and 10 with further reference to FIGS. 1, 2, 3 and 4, a method of operating the gas turbine engine is schematically shown and indicated at 120. A power demand of the aircraft is considered and communicated to an engine controller as indicated at 122. The engine controller 72 (FIG. 1) includes control over the first and second generators 66, 70. The engine controller 72 will set an initial power extraction proportion between each of the first and second generators 66, 70 that will satisfy the power demand. In other embodiments, controlled power extraction may be provided by other means including hydraulic pumps or other devices in combination with or in placement of generators 66 and 70. The engine controller 72 will include a predefine mapping of operation of each of the spools 30, 32, including how a net axial load varies during operation.

As is shown in graph 130 shown in FIG. 10, the net axial load 132 will shift axially aft and forward depending on increasing operating conditions indicated by arrow 134. Operating conditions can include rotor speed, discharge pressures, temperature and any other operating condition that is indicative of changes in axial load on a corresponding spool 30, 32. The graph 130 is an illustration of operation of conditions unique to one of the spools 30, 32. Each of the spools 30, 32 will have unique relationship between axial loads and operating conditions and be understood and defined within the controller 72. The understanding of the operating conditions and the proximity to the "null" condition are considered by the controller as indicated a 124 in FIG. 9.

The axial load 136 for engine operation is shown to shift during operation toward a "null" condition indicated at 142. In the "null" condition, the axial load is zero. The axial load may oscillate and even become negative as shown at 140. Moreover, the axial load may become unpredictable as it approaches the "null" condition indicated at 142. The example disclosed accessory drive system 16 enables varying of the axial load provided between the gear reaction loads to increase the axial load as indicated at 138 to prevent the "null" load condition. The additional axial load is provided by varying loads exerted through the corresponding tower shafts 66, 70. The loads on the tower shafts 66, 70 are in turn varied by changing the load exerted by a load generating device driven by a corresponding one of the first and second tower shafts 66, 70. In this disclosed example, the load generating devices are the first and second generators 64, 68.

The proportion of power extracted from each of the spools 30, 32 is varied to adjust the axial loads as is schematically indicated at 126 in FIG. 9. The proportioning of loads across the spools 30, 32 provides the total power demand while also providing the means to tailor and adjust axial loads. In this example, the proportion of power extracted from each spool 30, 32 is varied in response to operating conditions as indicated at 128 that are indicative of approaching the "null" load condition 142 as shown in graph 130. The proportion of power extracted from each spool 30, 32 can be continually varied and re-proportioned responsive to operating conditions to prevent the onset of "null" load conditions.

Accordingly, the disclosed accessory drive system 16 provides a proportioned extraction of power to reduce loads on any one spool while also enabling proportional tailoring of axial loads to prevent "null" load operation of each spool.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a first spool including a first compressor coupled to a first turbine through a first shaft;
a second spool including a second compressor coupled to a second turbine through a second shaft;
a first tower shaft coupled to the first shaft through a first gear assembly;
a second tower shaft couple to the second shaft through a second gear assembly; and
a first load generating device driven by the first tower shaft, wherein the first load generating device generates a first load on the first spool through the first tower shaft;
a second load generating device driven by the second tower shaft, wherein the second load generating device generates a second load on the second spool through the second tower shaft and the first load and the second load combine to apply a total load on the first spool and the second spool; and
a controller controlling each of the first load generating device and the second load generating device to vary a proportion of the total load applied to each of the first spool and the second spool to bias a direction of an axial load on each of the first spool and the second spool.

2. The gas turbine engine as recited in claim 1, wherein the axial load on each of the first spool and the second spool is biased away from a null load condition.

3. The gas turbine engine as recited in claim 2, wherein the first spool is supported for rotation by a first thrust bearing and the second spool is supported for rotation by a second thrust bearing and the controller varies each of the first load and the second load to maintain an axial load of a predefined amount on each of the first thrust bearing and the second thrust bearing.

4. The gas turbine engine as recited in claim 3, wherein the first load generating device comprises a first electric generator and the second load generating device comprises a second electric generator.

5. The gas turbine engine as recited in claim 4, including an accessory gearbox mounted to a static structure of the gas turbine engine and each of the first generator and the second generator are mounted to the accessory gearbox.

6. The gas turbine engine as recited in claim 5, wherein the first tower shaft and the second tower shaft are disposed about a common tower shaft axis of rotation.

7. The gas turbine engine as recited in claim 6, wherein the first tower shaft and the second tower shaft are concentric about the common tower shaft axis of rotation.

8. The gas turbine engine as recited in claim 4, wherein the first generator is mounted to a first accessory gearbox and the second generator is mounted to a second accessory gearbox and the first tower shaft extends radially outward and is spaced circumferentially apart from the second tower shaft.

9. The gas turbine engine as recited in claim 5, wherein the first generator and the second generator combine to generate a total amount of power with a proportion of the total amount of power varying between the first generator and the second generator.

10. A gas turbine engine comprising:
a first spool including a first compressor coupled to a first turbine through a first shaft;
a second spool including a second compressor coupled to a second turbine through a second shaft;
a first tower shaft coupled to the first shaft through a first gear assembly;
a second tower shaft couple to the second shaft through a second gear assembly; and
a first load generating means driven by the first tower shaft, wherein the first load generating means generates a first load on the first spool through the first tower shaft;
a second load generating means driven by the second tower shaft, wherein the second load generating means generates a second load on the second spool through the second tower shaft and the first load and the second load combine to apply a total load on the first spool and the second spool; and
a controller controlling each of the first load generating means and the second load generating means to vary a proportion of the total load applied to each of the first spool and the second spool to bias a direction of an axial load on each of the first spool and the second spool.

11. The gas turbine engine as recited in claim 10, wherein the axial load on each of the first spool and the second spool is biased in a direction away from a null load condition.

12. The gas turbine engine as recited in claim 11, wherein the first spool is supported for rotation by a first thrust bearing and the second spool is supported for rotation by a second thrust bearing and the controller varies each of the first load and the second load to maintain an axial load of a predefined amount on each of the first thrust bearing and the second thrust bearing.

13. The gas turbine engine as recited in claim 12, wherein the first load generating means and the second generating means combine to generate a total load corresponding to a total power demand with a proportion of the total load provided by each of the first load generating means and the second load generating means varied to provide a predefined axial load on the first spool and the second spool to maintain an axial bias along a longitudinal axis of the gas turbine engine.

14. A method of operating a gas turbine engine comprising:
generating a first axial load on a first spool with a first load generating device;
generating a second axial load on a second spool with a second load generating device, wherein the first load and the second load combine to apply a total load on the first spool and the second spool; and
varying a proportion of the first axial load and the second axial load combined to provide the total load to generate a predefined amount of axial load for each of the first spool and the second spool to prevent a null load condition on each of the first spool and the second spool.

15. The method as recited in claim 14, wherein the first spool includes a first compressor coupled to a first turbine through a first shaft, the second spool includes a second compressor coupled to a second turbine through a second shaft and each of the first spool and second spool define a varying balance of loads between the corresponding first and second compressors and the first and second turbines and the first load generating device coupled to the first spool and the second load generating device coupled to the second spool provide the corresponding first and second axial loads to maintain an axial bias on each of first and second spools.

16. The method as recited in claim 14, wherein the first load generating device is a first electric generator and the second load generating device is a second electric generator and a load applied by each of the first electric generator and the second electric generator are varied to apply the axial load to each of the first spool and the second spool.

17. The method as recited in claim 16, wherein the first electric generator and the second electric generator combine to produce a total amount of electric power and a controller varies a proportion of the total amount of electric power provided by each of the first and second electric generators to provide the desired axial load while maintaining the total amount of electric power constant.

18. The method as recited in claim 15, including a first gear assembly between a first tower shaft and the first load generating device and the first spool and a second gear assembly between a second tower shaft and the second load generating device and the second spool, wherein each of the first gear assembly and the second gear assembly provide a desired axial load on the corresponding one of the first spool and the second spool.

* * * * *